United States Patent [19]

Weinblatt

[11] Patent Number: 5,234,345

[45] Date of Patent: Aug. 10, 1993

[54] SURVEY TECHNIQUE FOR READERSHIP OF PUBLICATIONS

[76] Inventor: Lee S. Weinblatt, 797 Winthrop Road, Teaneck, N.J. 07666

[21] Appl. No.: 767,293

[22] Filed: Sep. 27, 1991

[51] Int. Cl.$^5$ .............................................. G09B 5/00
[52] U.S. Cl. ..................................... 434/236; 340/568; 340/572; 340/573
[58] Field of Search ................ 434/236; 340/568, 572, 340/573

[56] References Cited

U.S. PATENT DOCUMENTS

| 4,157,540 | 6/1979 | Oros | 340/573 |
| 4,659,314 | 4/1987 | Weinblatt | 434/236 |
| 4,726,771 | 2/1988 | Weinblatt | 434/236 |
| 4,780,704 | 10/1988 | Tommasini | 340/572 |
| 4,781,596 | 11/1988 | Weinblatt | 434/236 |
| 4,785,291 | 11/1988 | Hawthorne | 340/573 |
| 4,864,280 | 9/1989 | Van Der Meij | 340/572 |
| 4,939,326 | 7/1990 | Weinblatt | 200/506 |
| 5,014,040 | 5/1991 | Weaver et al. | 340/572 |
| 5,019,679 | 5/1991 | Weinblatt | 200/508 |

*Primary Examiner*—Gene Mancene
*Assistant Examiner*—Cindy A. Cherichetti
*Attorney, Agent, or Firm*—Frishauf, Holtz, Goodman & Woodward

[57] ABSTRACT

A technique for monitoring the readership of a magazine. Two cards are inserted into the magazine, one toward the front and the other toward the rear. Each card carries a transmitter which is triggered when the magazine is opened to the page it is at. The transmitters emit a signal which is detected and input to a timer. The triggering of the front card actuates the timer, and triggering of the rear card stops the timer. If the time interval recorded by the time between the triggering of the two cards exceeds a predetermined time interval, this is recorded as being indicative of readership.

18 Claims, 2 Drawing Sheets

SURVEY TECHNIQUE FOR READERSHIP OF PUBLICATIONS

BACKGROUND OF THE INVENTION

This invention is related to a technique for monitoring the exposure of selected publications to readers and, more particularly, to an accurate, reliable electronic technique for determining when the publication (e.g. a magazine) is open and an individual who has been selected as a test subject is positioned close enough to it so that he is likely to be reading it.

Various techniques are now in use to determine the readership of selected publications. Such publications are typically magazines. The term "magazine" will be used hereinafter to include any type of publication typified by a magazine. Publishers and advertisers require this information in order to determine readership which, in turn, is useful to set printing runs, establish advertising rates, indicate geographic areas for concentrating resources, provide an analysis of economic and social categories of the readership, and the like.

To currently obtain this information, such surveys are conducted primarily in one of two ways. Firstly, individuals are contacted personally or by phone and interviewed as to their magazine preferences. However, this method is inaccurate because it relies on memory recall of the individuals which has been shown as being suspect and insufficiently accurate. Moreover, once the interviewer reveals the magazine in which he is interested, the selected individual being interviewed may develop a subjective inclination in favor of that magazine which may not in fact be true.

The second approach involves collecting a number of volunteer or paid individuals who are expected to keep a diary of their reading habits. The diaries are then retrieved periodically from the individuals, and the entries are analyzed. However, this approach relies exclusively on the accurate and complete record keeping on the part of the particular individuals involved. Unfortunately, this also tends to be unreliable because people occasionally forget to make entries, they may be distracted from doing it, or, occasionally, may simply not be inclined to make an entry. Therefore, the techniques conventionally used up to the present time suffer from serious disadvantages which have caused concern about the accuracy and, therefore, the underlying value of such surveys.

U.S. Pat. No. 4,659,314 was issued Apr. 21, 1987 and U.S. Pat. No. 4,726,771. which is a CIP thereof, was issued Feb. 23, 1988. Both patents were issued to the present inventor and were aimed at overcoming the shortcomings of the above-discussed approaches, and these patents are incorporated by reference herein. The approach disclosed therein can be summarized as follows with relation to FIG. 1 which has been copied here from U.S. Pat. No. 4,726,771 for the sake of convenience. To conduct the survey, persons are selected by the surveying organization based on certain criteria. These criteria can be, for example, age, income, geographic location, sex, and level of education. The publisher and/or advertisers of the magazine may require an analysis of their readership which is broken down into one or more of these categories. The individuals who are approached to be test subjects are merely asked to participate in a test the details of which are not explained. Each person is told only that a requirement of the test is the wearing of a certain article of clothing. Additional information is preferably not supplied in order to avoid predisposing or prejudicing the individual test subject toward or away from the aims of the survey. For example, if the individual were to be told that the survey relates to magazines, then this might result in more attention being paid to perusing magazines than would be normal for that person. Even worse would be the situation were the individual told the particular magazine involved in the survey. In order to avoid this problem, each individual is given a conventional article of clothing, and is simply asked to wear it on a regular basis. For example, such an article of clothing might be a watch for men and a bracelet for women.

As depicted in FIG. 1, a transmitter unit 10 and a receiver unit 20 cooperate to provide information relating to the readership of a designated magazine by individuals who are selected to be test subjects. The transmitter unit 10 is preferably constructed in the form of a flat, ultra-thin, card-sized insert for the magazine. Various types of inserts have long been commonly placed in magazine copies to advertise such products as perfume or to provide a convenient mailing postcard for a particular purpose. Such a card is typically stapled into or adhesively secured to a page inside the magazine copy. In this manner, the transmitter unit is camouflaged so that it provides no indication to the reader of its true purpose. In fact, to enhance its camouflage it might even be printed with some type of advertisement or provided with a perfume-saturated sealed flap.

Internally, the "card" includes a battery 15 which powers transmitter 17. Battery 15 must, of course, be of the flat type with dimensions which, for example, are those of a battery currently available as part of a Polaroid film pack. Transmitter 17 can emit an analog or a digital magazine identification signal via antenna 19. This signal is set so that it utilizes a code that is unique to that particular magazine. Thus, Time magazine is assigned a signal code and Newsweek is assigned a different one. A transmitter 17 can be a microchip which is sized to be small enough and flat enough to be accommodated in the "card". In the preferred embodiment, transmitter 17 is digital and generates a particular digital code. Such transmitters are conventional and well known. Clothing tags in department stores currently contain such transmitter chips as part of an anti-theft system. As such, no further details of its circuitry and configuration is deemed necessary. Antenna 19 is a miniature wire which, however, is sufficiently effective to emit the desired signal for the necessary distance, as discussed below.

A receiver unit 20 is accommodated in the above-mentioned article of clothing such as a watch or bracelet. It serves some useful or decorative function for its wearer so that the particular individual is unaware of its significance as far as the conduct of a survey is concerned. A watch is ideal for this purpose because a timing circuit is required anyway for the desired operation of the circuitry, as explained below.

Receiver unit 20 includes a receiving antenna 21 connected to a receiver 23. Receiver 23 is a circuit which serves to distinguish the signal emitted by transmitter 17 from other signals which may be picked up by antenna 21. If transmitter 17 is analog in nature, then receiver 23 would be a filter responsive to a very narrow range of frequencies. However, in the preferred digital embodiment, receiver 23 is a logic circuit which responds only to the particular code emitted by transmitter 17. Such circuitry is conventional and well known. As such, no specific circuit details are deemed necessary.

When receiver 23 detects a signal corresponding to that emitted by transmitter 17, it sends a control signal to timer 25. Timer 25 is, in turn, connected to memory 27. When receiver 23 initially detects the signal from transmitter 17 which identifies a particular magazine, its control signal causes timer 25 to store in an address location of memory 27 the exact time when the identification signal was first detected. When the identification signal is no longer picked up by receiver 23, timer 25 is controlled to store in the next address location of memory 27 the exact time when that signal loss occurred. Thus, by subtracting the first time stored in the memory from the second time stored in the memory, a "reading period" is obtained. Each such reading period is representative not only of the exposure of the magazine to the reader but also of a "reading occurrence". An analysis can then be made of how many times the individual test subject picked up the magazine (i.e. how many reading occurrences) and, also, the length of time the magazine was read by that individual for each occurrence.

In an alternative embodiment, receiver 23 is connected directly to memory 27 via line 29 shown in broken lines. The control signal over line 29 from receiver 23 would be effective to store an occurrence signal in specially assigned address locations of memory 27. Thus, memory 27 would have one set of addresses dedicated to "occurrences" and another set of address locations dedicated to "reading periods".

The information content of a memory 27 is retrieved from it by terminal 31. It should be understood that terminal 31 is normally not coupled to memory 27 which is housed in the above-mentioned article of clothing. Terminal 31 is a remote unit which is coupled to the article of clothing by suitable plugs after it has been retrieved by the surveying organization from the individual test subject. A suitable plug is inserted into the watch, say, and the stored information is caused to be transferred from memory 27 to terminal 31. Terminal 31 can be another form of memory, a hard copy unit such as a printer, and/or a video display device.

A key feature of the technique disclosed in these patents is the requirement that the magazine identification signal emitted by transmitter 17 be detected by receiver 23 only when the magazine is within approximately one foot of the article of clothing containing receiver unit 20. This is accomplished by suitably adjusting the relationship between the transmitter power and the receiver sensitivity. The transmitter power can, for example, be reduced so as to be effective with a conventional receiver only up to the mentioned distance. On the other hand, the sensitivity of receiver 23 can likewise be adjusted so that it is low enough in comparison with what is emitted by a particular transmitter to detect signals only within the above-mentioned distance.

U.S. Pat. No. 4,726,771 discloses a number of embodiments of switch 16 that are used to trigger transmitter 17 when the magazine is opened to the place where the card has been inserted.

Although the just-described approach effectively overcomes the above-discussed shortcomings of prior art approaches, it has not completely solved the problem of providing the advertisers with satisfactory results. Some room for improvement exists because transmitter 17 can be triggered to emit its signal, thereby indicating that the magazine has been read, even though this may not really be so in actuality. For example, the test subject may have merely fanned the magazine. This certainly does not constitute the type of reading which the advertiser would regard as being meaningful because the advertisement of interest, at which the card has been placed, almost certainly would not have been read during a manipulation of the magazine in such a perfunctory manner. Also, the card might have been triggered even though only a very few of its pages were actually looked at attentively if by coincidence the card happened to be inserted into the magazine at, or on, one of them. If the information being sought involves readership of the magazine, then merely reading a few of its pages would not qualify, and yet the apparatus of U.S. Pat. Nos. 4,659,314 and 4,726,771 would indicate that the magazine was read. Consequently, the results attained with this technique leave something to be desired.

In addition, it has been explained above that U.S. Pat. No. 4,659,314 utilizes a timer 25 to provide a time duration for the magazine having been read. This is significant information to avoid the possibility of recording the triggering of transmitter 17 as an "occurrence" when the magazine was merely fanned or with only the reading of a few pages. However, storing time information requires memory space that can be quite considerable when many instances of magazine readership are recorded, and when the memory space is perhaps shared with other information for monitoring of advertising of another sort.

SUMMARY OF THE INVENTION

It is a primary object of the present invention to provide a technique for surveying magazine readership which provides improved accuracy.

Another object of the present invention is to provide a technique for surveying the readership of magazines without relying on stored time information.

A further object of the present invention is to provide a technique for surveying the readership of selected magazines which does not provide a false indication of readership if the magazine pages were merely fanned or if only a few pages have been read.

These and other objects of the invention are attained in accordance with one aspect of the present invention which is directed to a system for surveying the readership of a designated magazine by individuals selected as test subjects. The system includes at least one transmitter unit suitably sized for unobtrusive attachment at a corresponding at least one given page within a copy of the designated magazine, such unit having a transmitter means for emitting an output signal when the magazine copy is opened to the corresponding given page. A receiver unit is adapted to be worn by each of the selected individuals, and it includes detecting means for responding to the output signal to generate a corresponding at least one control signal, timer means actuated by the at least one control signal and stopped by the at least one control signal to produce a resulting signal related to a time interval between such actuation and stoppage, and memory means for recording the occurrence of the resulting signal.

Another aspect of the present invention is directed to a method for surveying the readership of a designated magazine by individuals selected as test subjects. The method comprises the steps of placing at least one transmitter unit suitably sized for unobtrusive attachment at a corresponding at least one given page within a copy of the designated magazine. An output signal is emitted from the transmitter unit when the magazine copy is opened to the given page. The output signal is detected with a receiver unit adapted to be worn by each of the selected individuals to generate a corresponding at least one control signal in response thereto. A timer is actuated by the at least one control signal, and the timer is subsequently stopped by the at least one control signal to produce a resulting signal related to a time interval between such actuation and stoppage. The occurrence of the resulting signal is recorded.

Yet another aspect of the present invention is directed to a method for surveying the readership of a magazine by individuals selected as test subjects. The method comprises the steps of opening a magazine to a page at which a transmitter unit has been attached thereby triggering the transmitter unit to emit a first output signal. The magazine is subsequently opened to a page to trigger emission of a second output signal by a transmitter unit, and the first and second output signals are detected. A determination is made as to whether a time interval between occurrence of the first and second output signals exceeds a predetermined time interval. An event is recorded if the determining step indicates that the predetermined time interval has been exceeded.

DETAILED DESCRIPTION OF THE INVENTION

Figure 1:
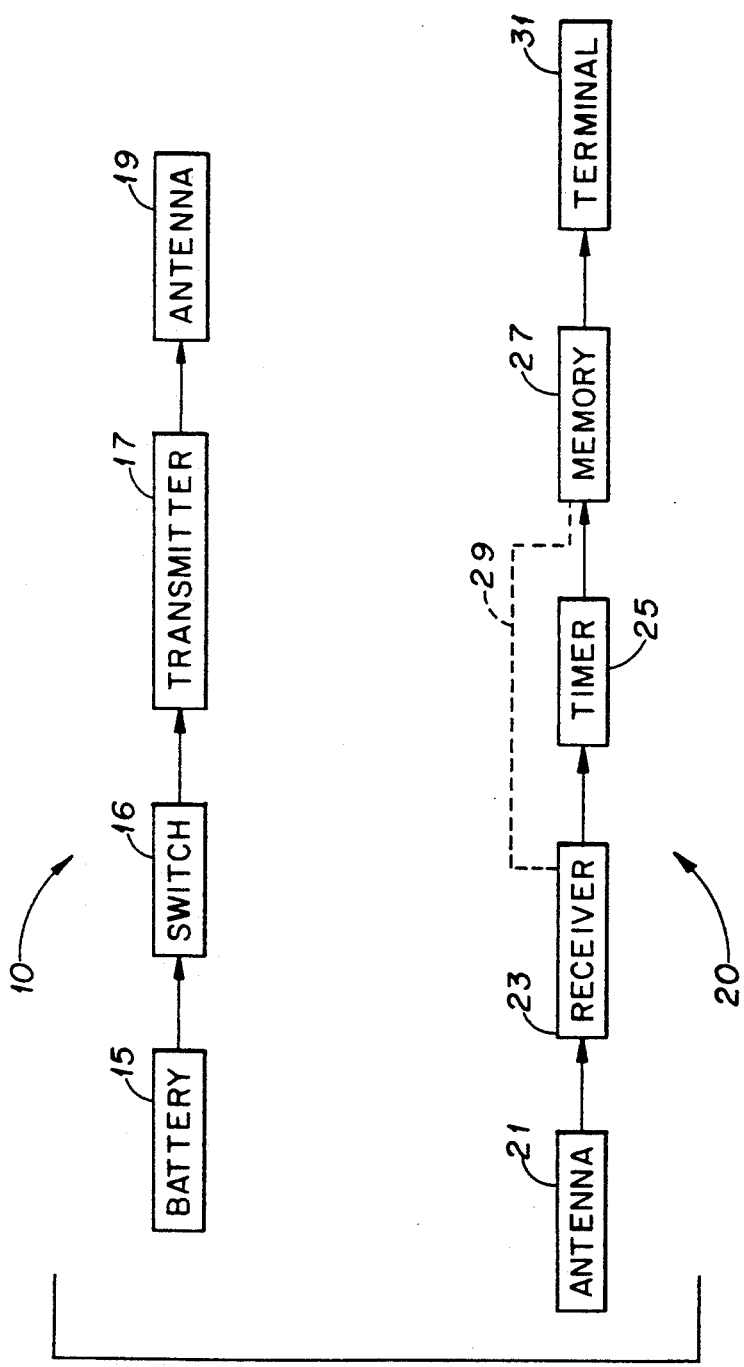
FIG. 1 depicts a schematic circuit block diagram of a magazine monitoring apparatus shown in the prior art.
Figure 2:
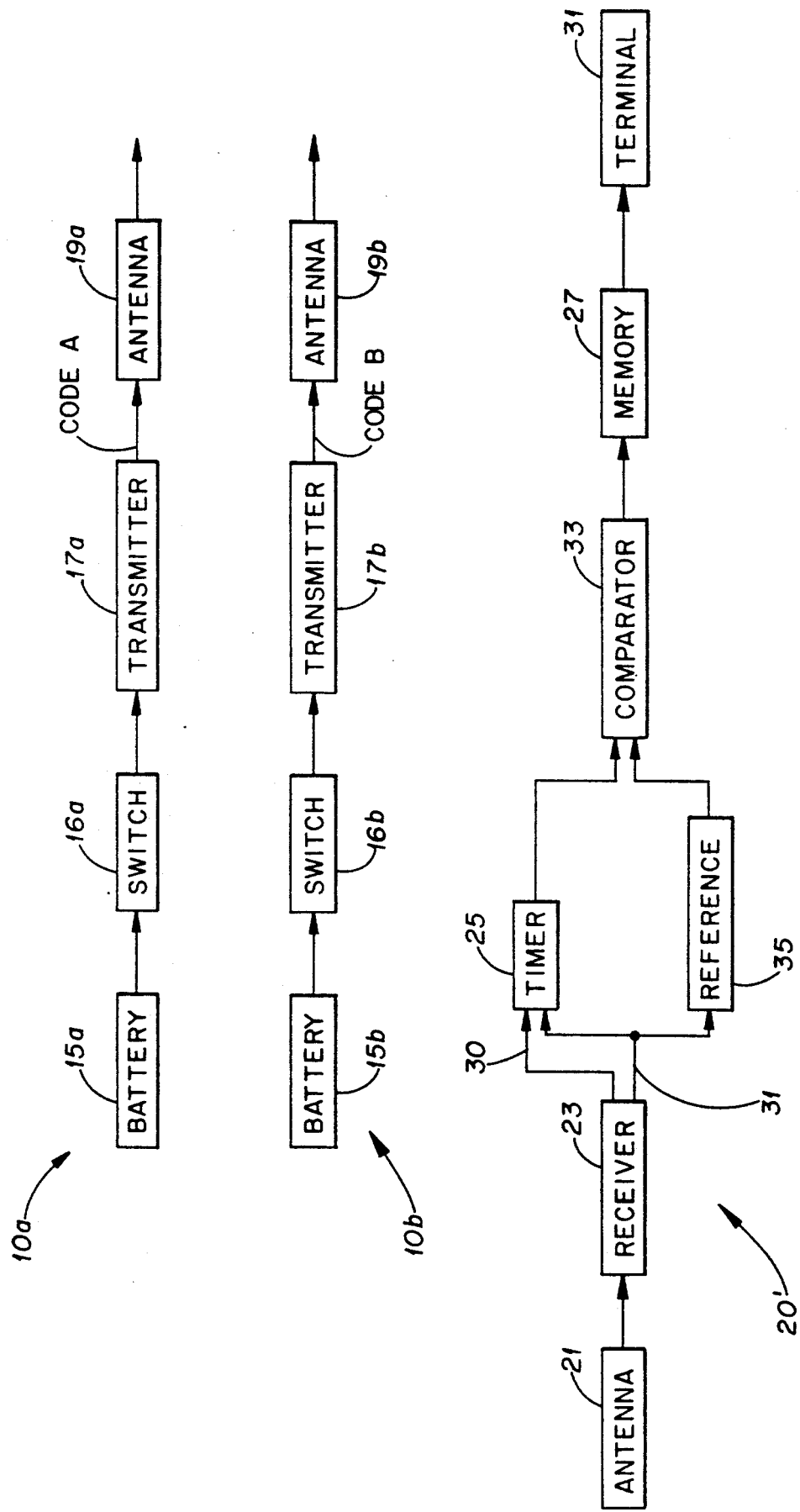
FIG. 2 depicts a schematic circuit block diagram of a magazine monitoring apparatus in accordance with the present invention.

FIG. 2 depicts the apparatus arranged in accordance with the present invention. This apparatus is a modification of the circuitry disclosed in U.S. Pat. No. 4,726,771, and to the extent possible utilizes the same numbering for ease of description and understanding.

In accordance with the present invention, two transmitter units, or cards, are used rather than one. These cards are identified by numerals 10a and 10b in FIG. 2. Card 10a is to be placed near the front of the magazine, while card 10b is to be placed toward the back of the magazine. Each of cards 10a and 10b is identical to card 10 of U.S. Pat. No. 4,726,771 in the sense that a battery (15a, 15b) is connected to a transmitter (17a, 17b) via a switch (16a, 16b). When the switch is closed, the transmitter 17 is triggered to produce a signal that is emitted via an antenna (19a, 19b). Cards 10a and 10b differ from each other only in that their respective output signals have a different code. As explained above, the transmitter in each of these cards produces a code that identifies the magazine into which it has been inserted. Transmitters 17a and 17b generate respective codes A and B which both provide the same information identifying the magazine into which the cards have been inserted. However, codes A and B include an additional bit of information. This bit identifies the card as being at the front or rear of the magazine. Thus, code A outputted by transmitter 17a has the bit at a logical "0", for example, while code B outputted by transmitter 17b has this bit at a logical "1". The logical "0" indicates that card 10a is at the front of the magazine, while the logical "1" indicates that card 10b is at the rear of the magazine.

Turning now to receiver unit 20', antenna 21 thereof receives codes A and B and inputs such signals to receiver 23. Receiver 23 includes suitable circuitry which responds only to codes A and B. When receiver 23 detects code A, it produces an output signal on line 30. On the other hand, when receiver 23 detects code B, it produces an output signal on line 31. The signals on lines 30 and 31 are inputted to timer 25. The signal on line 30 resets timer 25 and triggers initiation of the timer so that it begins to count up from zero, while the signal on output line 31 terminates the timing operation of timer 25. Thus, the output of timer 25 is a signal indicative of the time period between the occurrences of signals on lines 30 and 31. The output of timer 25 is provided to a comparator 33. The other input of comparator 33 is coupled to a reference circuit 35. Reference circuit 35 produces a reference time duration against which the output of timer 25 is compared. Reference circuit 35 can be adjusted to a time period that is related to the amount of time reasonably required by the average person to read the particular magazine and/or to suit the particular needs of the advertiser for which the monitoring is being carried out. Thus, for example, if the magazine is a relatively thin one, obviously the reference time will be commensurately short and, vice versa, when the magazine is relatively thicker, the span of time allotted for reading it will have to be increased by providing a higher amplitude reference signal. Comparator 33 determines whether the output of timer 25 at least equals the output of reference circuit 35. If so, this is taken as being indicative of a reading event, or occurrence. When such an event is detected by comparator 33, it produces an output signal which is provided to memory 27. Memory 27 can simply be a count-up register that keeps track of the total number of events. Thus, the amount of memory space required is minimal in comparison with that required to store actual time duration information as in U.S. Pat. No. 4,659,314. The function of terminal 31 is the same as discussed above.

The circuitry of receiver 23 is believed to be conventional and, as such, no further details thereof are deemed necessary.

It is readily apparent from the above that the present invention is capable of providing information which more accurately reflects that a magazine has actually been read. Specifically, if the magazine were fanned, then the time span between the emissions of codes A and B would result in the generation of signals on lines 30 and 31 that are relatively close to each other so that timer 25 would produce an output that does not exceed the output of reference circuit 35. Consequently, comparator 33 would not produce an output signal which is indicative of an event. Likewise, if the test subject were to attentively read only a few of the magazine pages, it is highly likely that the amount of time spent in doing so would also fail to exceed the reference time period set in reference circuit 35. Consequently, again the output of timer 25 would not exceed the output of reference circuit 35 and, therefore, no output from comparator 33 would be generated.

It is conceivable, however, that despite only a relatively few pages of a magazine being read, the amount of time spent in doing so may exceed the time span set in reference circuit 35. However, this would still fail to result in the indication of an event having occurred because, it must be recalled, that both transmitters 17a and 17b must be triggered to emit their respective codes. If by coincidence the few pages that were read by the test subject included that into which transmitter 17a was inserted, chances are that transmitter 17b would not have been included among those pages, and vice versa. By failing to trigger at least one of these transmitters, the circuitry should not generate a signal at the output of comparator 33 which is indicative of an event. However, it must be noted that if transmitter 17a was, in fact, so triggered by the test subject having read only a few pages, but transmitter 17b was not, then a signal will be generated on line 30 thereby actuating operation of timer 25. Since a signal on line 31 was not generated in view of transmitter 17b having not been triggered into its emission mode, timer 25 will simply continue operating indefinitely. Consequently, at some point the output signal of timer 25 will exceed the reference signal, and comparator 33 would produce a signal indicative of an event even though such an event did not in fact occur.

In order to avoid such an occurrence, the output of receiver 23 on line 31 is coupled to trigger reference circuit 35 to place its output signal at the input of comparator 33. Thus, timer 25 may be operating indefinitely due to its having been actuated by a signal on line 30. However, comparator 33 is incapable of making a comparison so long as no signal is present on its input from reference circuit 35. Thus, a comparison cannot be made until a signal from line 31 triggers reference circuit 35 to place its output signal at the input of comparator 33. A further variation involves coupling a signal from line 31 also to a triggering input on comparator 33. Comparator 33 would be deactivated until and unless a signal from line 31 of receiver 23 is provided to such a triggering input.

In the situation described just above of timer 25 being operated indefinitely due to a signal on line 30 but without a signal on line 31 following thereafter within a reasonable amount of time, it is obviously problematic to have such an uncontrolled time duration signal of the output of timer 25 because of its impact on the next instance of a magazine being read by the same test subject. More specifically, in the situation described just above, a signal on line 30 was generated due to the triggering of transmitter 17a. However, transmitter 17b was not so triggered. Consequently, timer 25 may have, for example, a time duration of one hour on it when the test subject picks up the next magazine. In such a case, the reference signal set in reference circuit 35 is, say, ten minutes. However, the test subject was reading the magazine for only one minute. Nevertheless, at the conclusion of that one minute timer 25 would show a reading period of one hour and one minute which would be sufficient to produce an output from comparator 33 even though the reference time duration was not exceeded. In order to avoid this situation, timer 25 is so designed as to be reset to zero each time it receives a signal on line 30. Thus, to repeat, line 30 not only actuates initiation of timer 25 but also resets it to zero.

Although a preferred embodiment of the present invention has been disclosed in detail above, various modifications thereto will be readily apparent to one skilled in the art. For example, receiver 23 has been disclosed as providing outputs on lines 30 and 31 corresponding to codes A and B. However, it is possible to connect two receivers 23 to antenna 21 for producing respective output signals corresponding to codes A and B. Also, these two signals can be provided on the same output line from receiver 30, and timer 25 can be provided with suitable identifying circuitry to distinguish between the two. Similarly, receiver 23 can also provide the same output signal in response to both codes A and B. This has the advantage of being able to utilize all the available bits for use as magazine identifying codes without devoting one bit for the front/rear differentiation as between cards 10a and 10b. Timer 25 can then be suitably designed so that it can be actuated to start its timing operation by the first such signal, and to terminate that operation by the subsequent such signal. However, such an arrangement would encounter difficulties in a situation where transmitter 17a is triggered while transmitter 17b is not (such as when only a few pages are read) because the above-described approach of utilizing the signal on line 31 to also actuate reference circuit 35 is not available. Nevertheless, such an arrangement can still be made operable by providing timer 25 with a "time-out" function. More specifically, if the reference signal is set at, say ten minutes, the "time-out" period can be set at, say, thirty minutes. If thirty minutes pass without a second signal being received by timer 25 from receiver 23, timer 25 will be reset to zero since this will be regarded as a situation in which only transmitter 17a or 17b has been triggered due to the reading of only a few pages by the test subject. It is possible in such a situation that an occurrence of an event will be missed if, for example, the reading of the few pages takes five minutes, and the test subject picks up a second magazine twenty-five minutes after transmitter 17a was triggered on. The reading of magazine B will also generate a signal on line 30 when transmitter 17b is triggered. However, this signal will reset timer 25 to zero because it is the second one received by the timer. Thus, timer 25 will be deactivated, and the reading of magazine B will not be monitored. However, the likelihood of such an occurrence can be taken into account in deciding whether the test subject is in a position to perform two readings so close in time one after the other. If so, then perhaps this approach will not be used. The above-mentioned advantage will have to be weighed against this disadvantage.

Another modification is reliance on a repeated signal from only one card as being indicative of readership. It may be that some readers tend to completely avoid the section of the magazine in which one of cards 10a, 10b is inserted. For example, men may avoid an article or section on food preparation, while women may avoid the section on guns. Even though the test subject read the entire magazine, except for this particular section, a signal from both cards would not be triggered and, therefore the test subject would not be credited for readership, contrary to fact. In order to capture such a readership situation and record it as an event, it is advisable to use the approach of controlling actuation and stoppage of the timer even by a signal from the same card. An event would be recorded if a minimum time interval transpires between the two signals. This indicates that the test subject was interested enough to read and re-read the section of the magazine in which the card which has been triggered is located. Some advertisers may be satisfied with such an occurrence as being indicative of attentiveness and even of more extensive reading of the magazine than just that section. In the embodiment of FIG. 2 in which receiver circuit 23 produces a different output signal in response to triggering of cards 10a and 10b, this modification could be implemented by ORing the two inputs to timer 25 from receiver circuit 23. If the receiver circuit 23 produces the same output signal in response to emission of a signal from both cards 10a and 10b, then the circuitry inherently responds as described above to triggering of both cards or to re-triggering of the same card.

Switch 16 has been disclosed as a mechanical switch. Another modification is to utilize a light-sensitive switch instead. Such a switch would respond to light hitting it when the magazine is opened to the page at which it is attached. Light-sensitive switches are well known and, therefore, no details thereof are deemed necessary.

These and other such modifications are all intended to be included within the scope of the present invention as defined by the following claims.

I claim:

1. A system for surveying the readership of a designated magazine by individuals selected as test subjects, comprising:
   at least one transmitter unit suitably sized for unobtrusive attachment at a corresponding at least one given page within a copy of said designated magazine, and including a transmitter means for emitting an output signal when said magazine copy is opened to said corresponding given page; and
   a receiver unit adapted to be worn by each of said selected individuals and including detecting means for responding to transmittal of said output signal to generate a corresponding one or more control signals, timer means actuated by at least one of said control signals and stopped by at least one of said control signals to produce a resulting signal related to a time interval between such actuation and stoppage, and memory means for recording the occurrence of said resulting signal.

2. The system of claim 1, wherein said at least one transmitter unit consists of one transmitter unit.

3. The system of claim 1, wherein said at least one transmitter unit consists of two transmitter units.

4. The system of claim 3, wherein said two transmitter units are adapted to be respectively inserted toward the front and back of said designated magazine respectively.

5. The system of claim 4, wherein said two transmitter units emit the same output signal.

6. The system of claim 4, wherein said two transmitter units emit, as part of said output signal, a position signal indicative of generally where the respective transmitter unit is placed in the designated magazine.

7. The system of claim 6, wherein said one or more control signal consists of the same control signals generated in response to both output signals from said two transmitter units.

8. The system of claim 7, wherein said timer means is actuated by said one control signal related to the output signal from the transmitter unit placed toward the front of the magazine, and stopped by said one control signal related to the identification signal of said transmitter unit placed toward the back of the magazine.

9. The system of claim 7, wherein said timer means is actuated by a control signal related to an output signal from one of said two transmitter units, and said timer means is stopped by a control signal related to another output signal from said one transmitter unit.

10. The system of claim 6, wherein said one or more control signals consists of first and second control signals different form each other and generated in response, respectively, to the output signals of said two transmitter units.

11. The system of claim 10, wherein said timer means is actuated by said first control signal related to the output signal from the transmitter unit placed toward the front of the magazine, and stopped by the second control signal related to the output signal from the transmitter unit placed toward the back of the magazine.

12. The system of claim 11 wherein said timer means comprises a source of a reference time interval signal, and a comparator coupled to said source and to said timer means.

13. The system of claim 6, wherein said two transmitter units emit, as another part of said output signal, an identification signal which is unique to said designated magazine.

14. The system of claim 4, wherein said one or more control signals consists of the same control signals generated in response to both output signals from said two transmitter units.

15. The system of claim 1, wherein said timer means comprises a source of a reference time interval signal, and a comparator coupled to said source and to said timer means.

16. The system of claim 1, wherein said output signal of said at least one transmitter unit comprises an identification signal which is unique to said designated magazine.

17. A method for surveying the readership of a designated magazine by individuals selected as test subjects, comprising the steps of:
   placing at least one transmitter unit suitably sized for unobtrusive attachment at a corresponding at least one given page within a copy of said designated magazine;
   emitting an output signal from said transmitter unit when said magazine copy is opened to said given page;
   detecting said output signal with a receiver unit adapted to be worn by each of said selected individuals to generate a corresponding at least one control signal in response thereto;
   actuating a timer by said at least one control signal and
   stopping said timer by said at least one control signal to produce a resulting signal related to a time interval between such actuation and stoppage; and
   recording the occurrence of said resulting signal.

18. A method for surveying the readership of a magazine by individuals selected as test subjects, comprising the steps of:
   opening a magazine to a page at which a transmitter unit has been attached thereby triggering said transmitter unit to emit a first output signal;
   opening said magazine to a page to trigger emission of a second output signal by a transmitter unit;
   detecting said first and second output signals;
   determining whether a time interval between occurrence of said first and second output signals exceeds a predetermined time interval; and
   recording an event if the determining step indicates that the predetermined time interval has been exceeded.

* * * * *